(12) United States Patent
Pejathaya

(10) Patent No.: US 11,370,332 B2
(45) Date of Patent: Jun. 28, 2022

(54) LATCH MECHANISM FOR SEAT ASSEMBLY

(71) Applicant: FISHER & COMPANY, INCORPORATED, St. Clair Shores, MI (US)

(72) Inventor: Srinivas Pejathaya, Udupi (IN)

(73) Assignee: Fisher & Company, Incorporated, St. Clair Shores, MI (US)

(*) Notice: Subject to any disclaimer, the term of this patent is extended or adjusted under 35 U.S.C. 154(b) by 0 days.

(21) Appl. No.: 17/209,291

(22) Filed: Mar. 23, 2021

(65) Prior Publication Data
US 2021/0394651 A1    Dec. 23, 2021

(30) Foreign Application Priority Data

Jun. 19, 2020  (IN) .............................. 202021025905

(51) Int. Cl.
*B60N 2/22* (2006.01)
*B60N 2/30* (2006.01)

(52) U.S. Cl.
CPC .......... *B60N 2/2245* (2013.01); *B60N 2/3011* (2013.01)

(58) Field of Classification Search
CPC ........................... B60N 2/2245; B60N 2/3011
USPC ....................................... 297/378.12–378.14
See application file for complete search history.

(56) References Cited

U.S. PATENT DOCUMENTS

| 3,893,206 | A | 7/1975  | Pickles et al.   |
| 4,010,979 | A | 3/1977  | Fisher, III et al. |
| 4,076,309 | A | 2/1978  | Chekirda et al.  |
| 4,103,970 | A | 8/1978  | Homier           |
| 4,219,234 | A | 8/1980  | Bell             |
| 4,365,838 | A | 12/1982 | Berg             |
| 4,579,387 | A | 4/1986  | Bell             |
| 4,634,182 | A | 1/1987  | Tanaka           |
| 4,645,263 | A | 2/1987  | Fourrey et al.   |
| 4,659,146 | A | 4/1987  | Janiaud          |
| 4,687,252 | A | 8/1987  | Bell et al.      |
| 4,711,493 | A | 12/1987 | Schrom et al.    |

(Continued)

FOREIGN PATENT DOCUMENTS

FR     73767 E    1/1961
GB   1526861 A   10/1978
(Continued)

OTHER PUBLICATIONS

Office Action regarding German Patent Application No. 102015110762.7, dated Jan. 5, 2021. Translation provided by Witte, Weller & Partner Patentanwälte mbB.

(Continued)

*Primary Examiner* — Mark R Wendell
(74) *Attorney, Agent, or Firm* — Harness, Dickey & Pierce, P.L.C.

(57) ABSTRACT

A latch mechanism for a vehicle seat includes a latch, a plate and a second cam. The latch is movable between a first position in which the latch is engaged with a striker and a second position in which the latch is disengaged from the striker. The plate defines an arcuate slot. The second cam is coupled to the plate and includes a body and a protrusion extending outwardly from the body. The protrusion is received in the arcuate slot and is configured to traverse the arcuate slot when the latch is in the first position.

20 Claims, 7 Drawing Sheets

(56) References Cited

U.S. PATENT DOCUMENTS

| | | |
|---|---|---|
| 4,720,145 A | 1/1988 | Bell |
| 4,726,622 A | 2/1988 | Palvolgyi |
| 4,733,912 A | 3/1988 | Secord |
| 4,747,641 A | 5/1988 | Bell |
| 4,773,693 A | 9/1988 | Premji et al. |
| 4,789,205 A | 12/1988 | Pipon et al. |
| 4,795,213 A | 1/1989 | Bell |
| 4,822,100 A | 4/1989 | Bell |
| 4,874,205 A | 10/1989 | Arefinejad et al. |
| 5,380,060 A | 1/1995 | Sponsler et al. |
| 5,383,707 A | 1/1995 | Osenkowski et al. |
| 5,425,598 A | 6/1995 | Pennington |
| 5,460,429 A | 10/1995 | Whalen |
| 5,476,307 A | 12/1995 | Whalen |
| 5,489,141 A | 2/1996 | Strausbaugh et al. |
| 5,492,389 A | 2/1996 | McClintock et al. |
| 5,590,932 A | 1/1997 | Olivieri |
| 5,603,550 A | 2/1997 | Holdampf et al. |
| 5,718,481 A | 2/1998 | Robinson |
| 5,749,625 A | 5/1998 | Robinson |
| 5,749,626 A | 5/1998 | Yoshida |
| 5,915,779 A | 6/1999 | Duchateau |
| 5,938,286 A | 8/1999 | Jones et al. |
| 5,951,108 A | 9/1999 | Bauer et al. |
| 6,161,899 A | 12/2000 | Yu |
| 6,283,550 B1 | 9/2001 | Vialatte et al. |
| 6,378,920 B1 | 4/2002 | Ostrowski et al. |
| 6,540,272 B2 | 4/2003 | Spurr |
| 6,733,078 B1 * | 5/2004 | Zelmanov ............ B60N 2/2245 292/201 |
| 8,029,030 B2 * | 10/2011 | Shimura ................ E05B 83/16 292/216 |
| 9,493,097 B2 | 11/2016 | Pejathaya |
| 9,994,129 B1 * | 6/2018 | Shirokane ............ B60N 2/2245 |
| 11,110,819 B2 * | 9/2021 | Barzen ...................... F16B 5/06 |
| 2004/0021357 A1 | 2/2004 | Denning |
| 2008/0054151 A1 * | 3/2008 | Shimura ................ E05B 85/26 248/503.1 |
| 2009/0033138 A1 | 2/2009 | Yamada et al. |
| 2012/0301212 A1 * | 11/2012 | Champ .................. B60N 2/305 403/27 |
| 2013/0313395 A1 | 11/2013 | Blake et al. |
| 2016/0009202 A1 | 1/2016 | Pejathaya |
| 2018/0290565 A1 | 10/2018 | Tone et al. |

FOREIGN PATENT DOCUMENTS

| | | |
|---|---|---|
| GB | 1546104 A | 5/1979 |
| GB | 2503957 A | 1/2014 |

OTHER PUBLICATIONS

Office Action regarding Indian Patent Application No. 202021025905, dated Jan. 28, 2022.

* cited by examiner

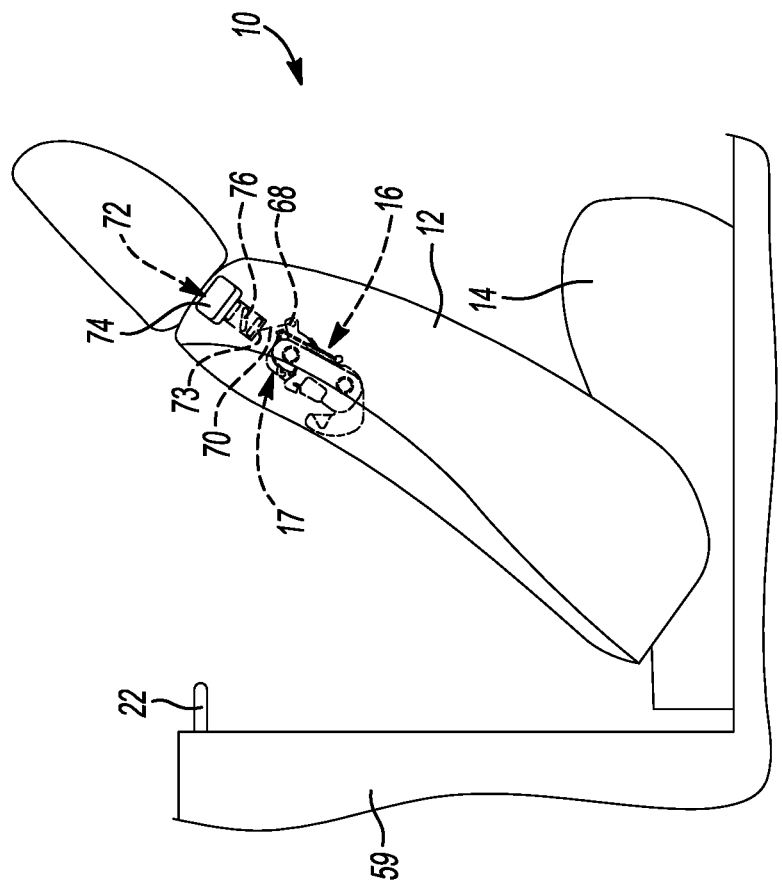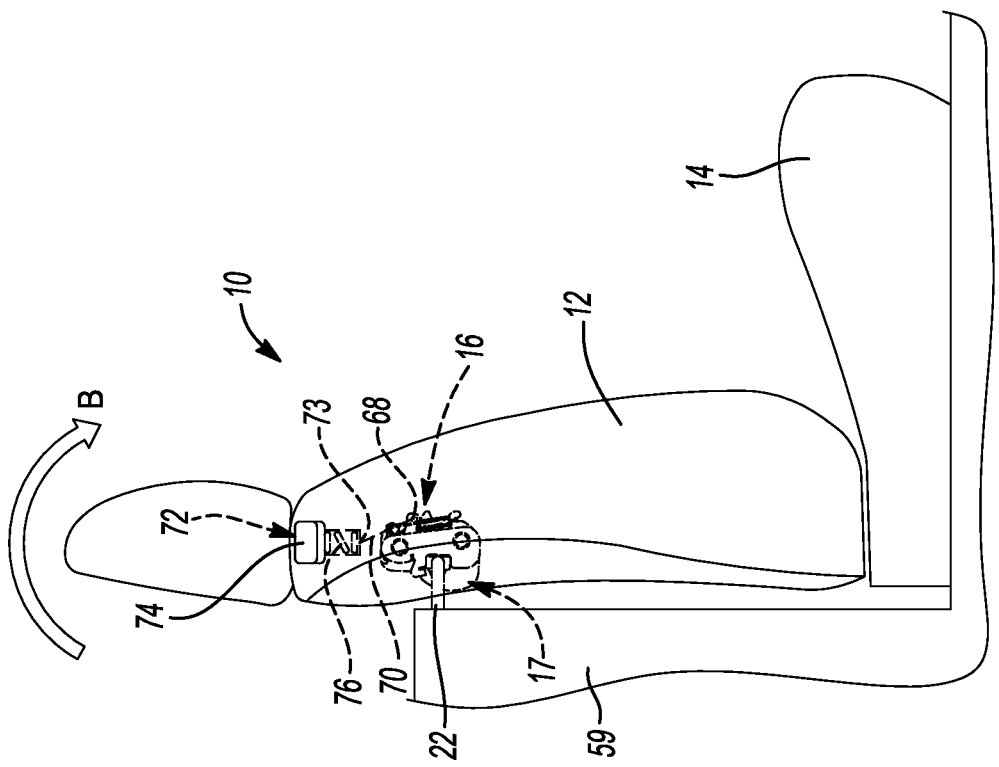

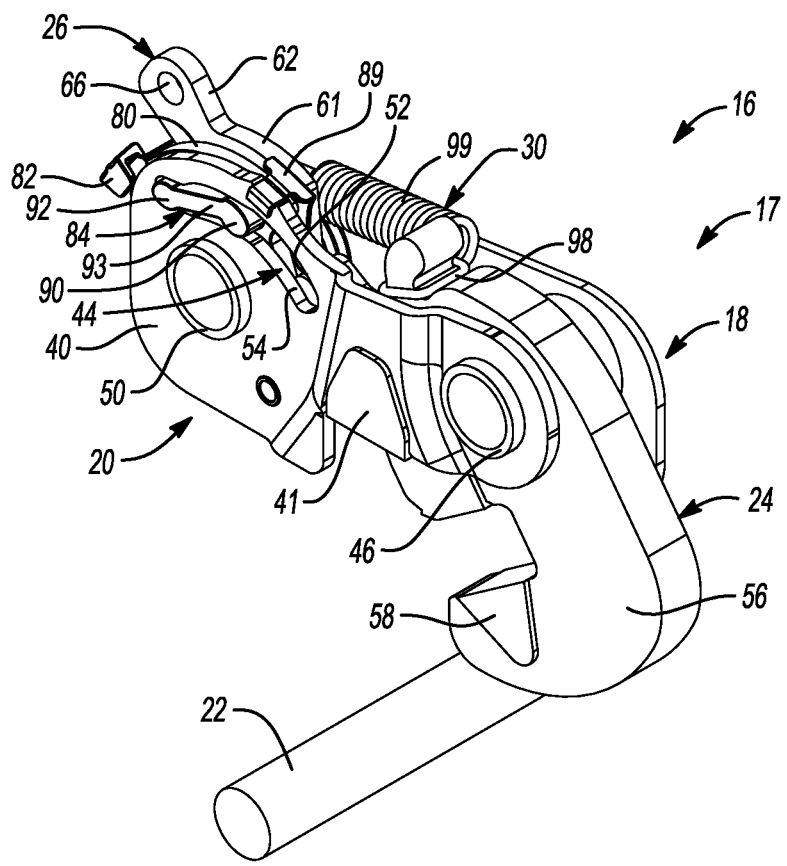
Fig-11
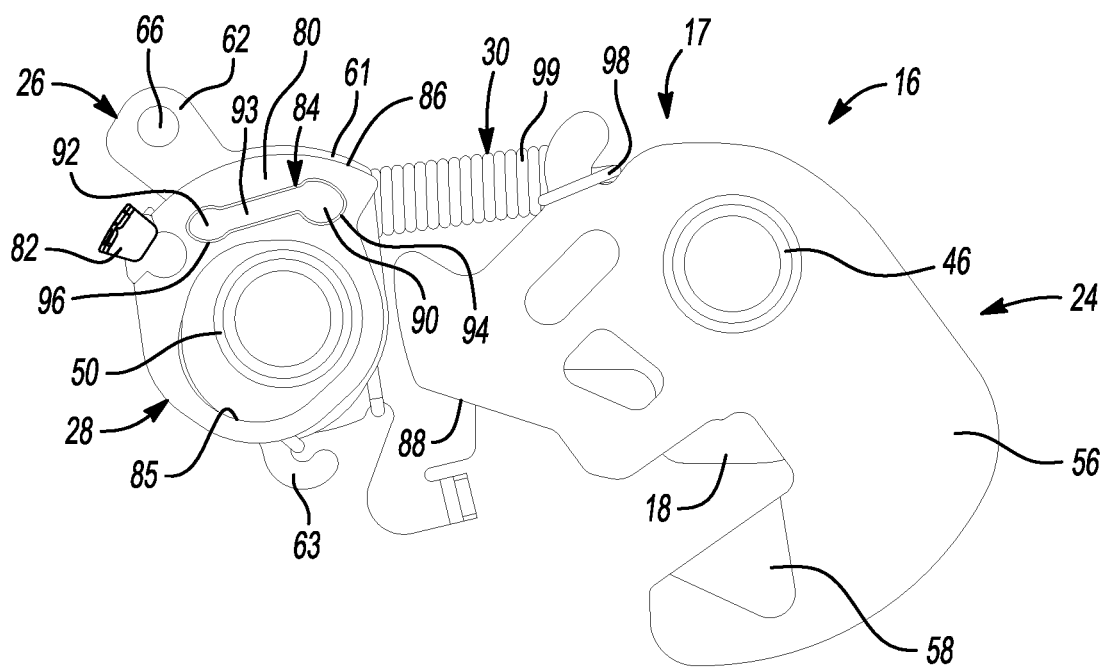
Fig-12

LATCH MECHANISM FOR SEAT ASSEMBLY

CROSS-REFERENCE TO RELATED APPLICATIONS

This application claims the benefit and priority of Indian Patent Application No. 202021025905, filed Jun. 19, 2020. The entire disclosure of the above application is incorporated herein by reference.

FIELD

The present disclosure relates to a latch mechanism for a seat assembly.

BACKGROUND

This section provides background information related to the present disclosure and is not necessarily prior art.

Vehicle seats often include a latch assembly that is movable between a latched position in which the latch assembly engages a striker to prevent rotation of the seatback relative to the seat bottom, and an unlatched position in which the latch assembly disengages the striker to allow rotation of the seatback relative to the seat bottom. Such latch assemblies are not able to effectively engage the striker when the striker varies its position in multiple directions.

SUMMARY

This section provides a general summary of the disclosure, and is not a comprehensive disclosure of its full scope or all of its features.

In one form, the present disclosures provides a latch mechanism that includes a latch, a plate and a second cam. The latch is movable between a first position in which the latch is configured to be engaged with a striker and a second position in which the latch is configured to be disengaged from the striker. The plate defines an arcuate slot. The second cam is coupled to the plate and includes a body and a protrusion extending outwardly from the body. The protrusion is received in the arcuate slot and is configured to traverse the arcuate slot when the latch is in the first position.

In some configurations of the latch mechanism of the above paragraph, the arcuate slot includes a first contoured surface and a second contoured surface. The protrusion includes a first end that contacts the first contoured surface and a second end that contacts the second contoured surface.

In some configurations of the latch mechanism of any one or more of the above paragraphs, the first end is spaced apart from the second contoured surface and the second end is spaced apart from the first contoured surface.

In some configurations of the latch mechanism of any one or more of the above paragraphs, the first end has a first diameter and the second end has a second diameter. The first diameter is larger than the second diameter.

In some configurations of the latch mechanism of any one or more of the above paragraphs, a profile of the first contoured surface is different from a profile of the second countered surface.

In some configurations of the latch mechanism of any one or more of the above paragraphs, the protrusion is an elongated protrusion.

In some configurations of the latch mechanism of any one or more of the above paragraphs, the body includes an outer surface profile and the latch includes a wedge lock surface. The outer surface profile contacts the wedge lock surface when the latch is in the first position to prevent the latch from moving from the first position to the second position.

In some configurations of the latch mechanism of any one or more of the above paragraphs, a first cam is moveable relative to the plate between a first state in which the latch is prevented from moving from the first position to the second position, and a second state in which the latch is allowed to move from the first position to the second position.

In some configurations of the latch mechanism of any one or more of the above paragraphs, the first cam is movable independently of the second cam.

In some configurations of the latch mechanism of any one or more of the above paragraphs, the second cam is engaged with the latch when the first cam is in the first state and disengaged from the latch when the first cam is in the second state.

In some configurations of the latch mechanism of any one or more of the above paragraphs, a first spring biases the latch toward the second position.

In some configurations of the latch mechanism of any one or more of the above paragraphs, a second spring biases the first cam toward the first state.

In another form, the present disclosure provides a latch mechanism for a seat assembly having a seatback and a seat bottom. The latch mechanism includes a latch, a plate and first and second cams. The latch is coupled to one of the seatback and the seat bottom and movable between a first position in which the latch is configured to be engaged with a striker to prevent relative rotation between the seatback and the seat bottom and a second position in which the latch is configured to be disengaged from the striker to allow relative rotation between the seatback and the seat bottom. The plate is fixed to the one of the seatback and the seat bottom and defines an arcuate slot. The first cam is moveable between a first state in which the latch is prevented from moving from the first position to the second position, and a second state in which the latch is allowed to move from the first position to the second position. The second cam is coupled to the plate and includes a body and a protrusion extending outwardly from the body. The protrusion is received in the arcuate slot and is configured to traverse the arcuate slot. The first cam is moveable independently of the second cam.

In some configurations of the latch mechanism of the above paragraph, the arcuate slot includes a first contoured surface and a second contoured surface. The protrusion includes a first end that contacts the first contoured surface and a second end that contacts the second contoured surface.

In some configurations of the latch mechanism of any one or more of the above paragraphs, the first end is spaced apart from the second contoured surface and the second end is spaced apart from the first contoured surface.

In some configurations of the latch mechanism of any one or more of the above paragraphs, the first end has a first diameter and the second end has a second diameter. The first diameter is larger than the second diameter.

In some configurations of the latch mechanism of any one or more of the above paragraphs, a profile of the first contoured surface is different from a profile of the second contoured surface.

In some configurations of the latch mechanism of any one or more of the above paragraphs, the protrusion is an elongated protrusion.

In some configurations of the latch mechanism of any one or more of the above paragraphs, a first spring biases the latch toward the second position.

In some configurations of the latch mechanism of any one or more of the above paragraphs, a second spring biases the first cam toward the first state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a side view of a vehicle seat assembly in an upright position including a latch assembly according to the principles of the present disclosure;

FIG. 2 is a side view of the vehicle seat assembly of FIG. 1 with a seatback in a forward dump position;

FIG. 11 is a perspective view of the latch assembly in a fully unlatched state; and FIG. 12 is a front view of the latch assembly in the state of FIG. 11 with the outer plate removed for clarity.

Corresponding reference numerals indicate corresponding parts throughout the several views of the drawings.

DETAILED DESCRIPTION

Figure 3:
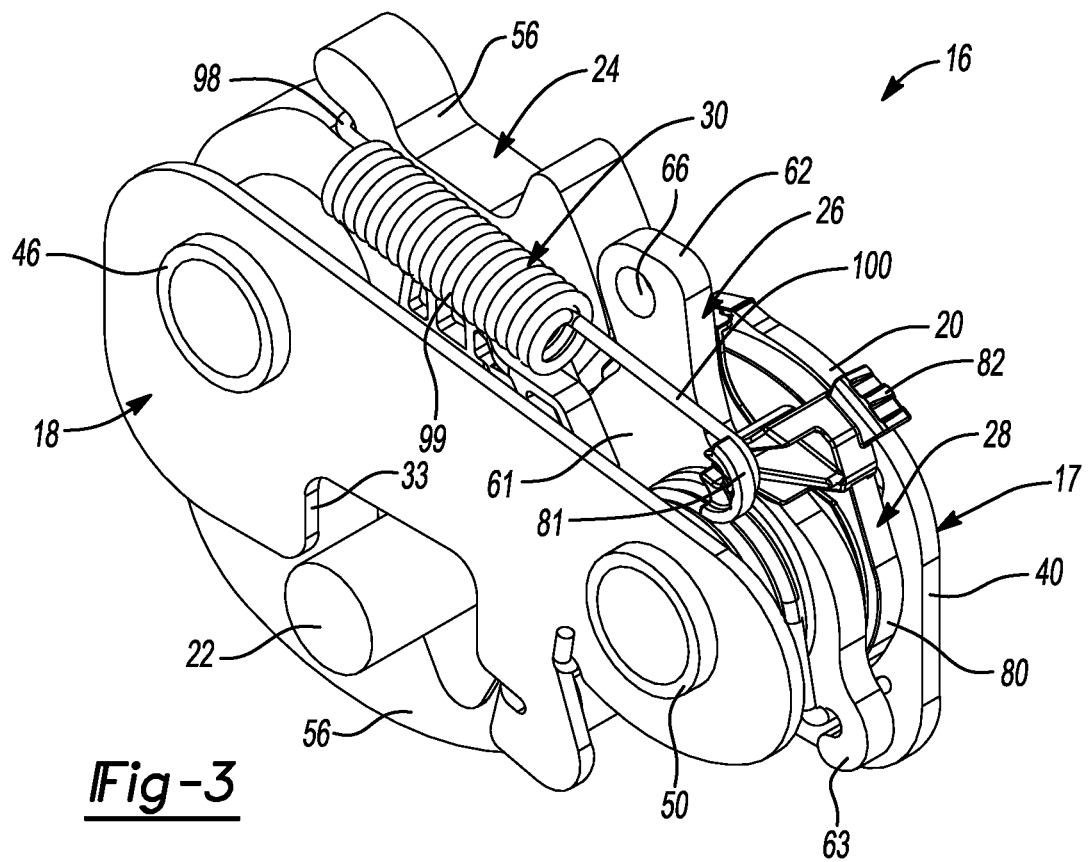
FIG. 3 is a perspective view of the latch assembly of FIG. 1.
Figure 4:
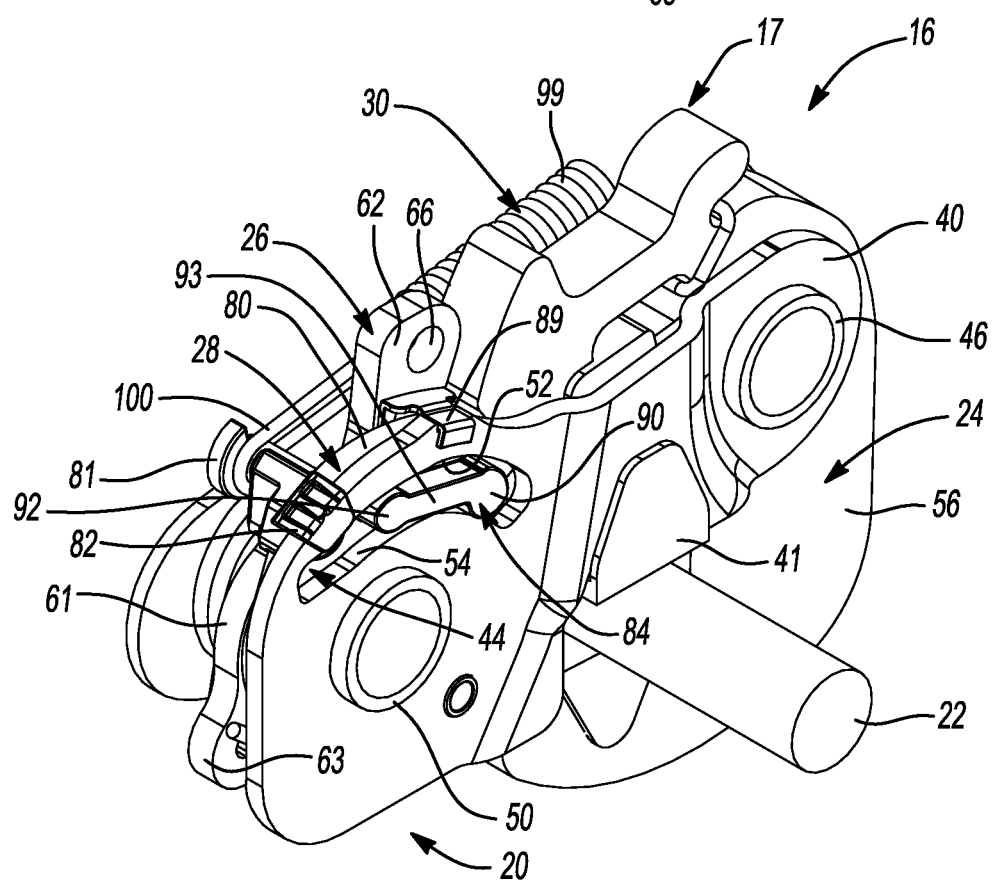
FIG. 4 is another perspective view of the latch assembly of FIG. 1.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIGS. 1 and 2, a vehicle seat assembly 10 is provided. The vehicle seat assembly 10 may be positioned within a vehicle (not shown) and may include a seatback 12, a seat bottom 14, and a seat latch assembly 16. The seat latch assembly 16 is connected to the seatback 12 (i.e., the latch assembly 16 is connected to a frame of the seatback 12 that may be disposed within and covered by upholstery and/or cushioning). The latch assembly 16 may be operable between a latched state to allow movement of the seatback 12 relative to the seat bottom 14 and an unlatched state to restrict movement of the seatback 12 relative to the seat bottom 14. As shown in FIG. 3-12, the latch assembly 16 may include a latch mechanism 17 and a striker 22.

The latch mechanism 17 may include a first or inner plate 18, a second or outer plate 20, a latch or claw 24, first and second cams 26, 28 and first and second springs 30, 32. The first plate 18 may be fixed to the seatback 12 and may include a first aperture 34 (FIGS. 5 and 6) at or near a first end 36 of the first plate 18 and a second aperture 38 (FIGS. 5 and 6) at or near a second end 39 of the first plate 18 that is opposite the first end 36. The first plate 18 also includes a rectangular-shaped cut-out 33 (FIGS. 3, 5 and 6) formed in a periphery of the first plate 18. The cut-out 33 accommodates the striker 22 when the latch assembly 16 is in the latched state.

The second plate 20 may be spaced apart from the first plate 18 to define a space there between. The latch 24, the first and second cams 26, 28 and the first and second springs 30, 32 may be housed or accommodated within the space. With reference to FIGS. 3-7, 9 and 11, the second plate 20 may be a unitary component that includes a body 40 and a stop 41. The body 40 may be made of a metallic material (e.g., steel) and may include a first aperture 42 (FIGS. 5 and 6), a second aperture 43 (FIGS. 5 and 6), and an elongated slot 44 (FIGS. 4-7, 9 and 11). The first aperture 42 may be at or near a first end 45 of the second plate 20, and may be aligned with the first aperture 34 of the first plate 18. In this way, a latch fastener 46 may extend through the first apertures 34, 42 of the plates 18, 20, respectively, thereby coupling (e.g., fixing) the plates 18, 20 to each other and to the seatback 12 (the latch fastener 46 is also mounted to the seatback 12). The second aperture 43 may be at or near a second end 48 of the second plate 20 that is opposite the first end 45, and may be aligned with the second aperture 38 of the first plate 18. In this way, a cam fastener 50 may extend through the second apertures 38, 43 of the plates 18, 20, respectively, thereby further coupling (e.g., fixing) the plates 18, 20 to each other and to the seatback 12 (the cam fastener 50 is also mounted to the seatback 12).

The slot 44 may be arcuate and may extend from the second end 48 of the second plate 20 toward the first end 45 of the second plate 20. The slot 44 may receive a portion of the second cam 28 and may guide movement of the second cam 28. That is, the slot 44 may include a first contoured surface 52 and a second contoured surface 54 that define the path of movement of the second cam 28. Stated differently, the path that the second cam 28 moves (slides and/or rotates) may be controlled by controlling the profiles of the first and second contoured surfaces 52, 54. The profile of the first contoured surface 52 may be different from the profile of the second contoured surface 54.

The stop 41 may be made of a polymeric material and may be generally triangular-shaped. The stop 41 may be configured to engage the striker 22 when the latch assembly 16 is in the latched state. In this way, the latch assembly 16 is prevented from making noise due to the prevention of metal-to-metal contact between the striker 22 and the second plate 20. The striker 22 may be fixed to a structural component 59 (e.g., a vehicle frame, body, or interior wall or floor).

The latch 24 is rotatably coupled to and supported by the latch fastener 46 between a latched position (FIGS. 3, 4 and 7) in which the latch 24 is engaged with the striker 22 to prevent relative rotation between the seatback 12 and the seat bottom 14, and a unlatched position (FIGS. 9 and 11) in which the latch 24 is disengaged from the striker 22 to allow relative rotation between the seatback 12 and the seat bottom 14.

With reference to FIGS. 3-12, the latch 24 may be a unitary component that includes a body 56 and a stop 58. The body 56 may be made of a metallic material (e.g., steel) and may include an aperture 60. The aperture 60 may be aligned with the first apertures 34, 42 of the first and second plates 18, 20 such that the latch fastener 46 also extends through the aperture 60 of the latch 24. In this way, the latch 24 is rotatably coupled to and supported by the cam fastener 50.

The stop 58 may be made of a polymeric material and may be generally triangular-shaped. The stop 58 may be configured to engage the striker 22 when the latch 24 is moved to the latched position. In this way, the latch assembly 16 is further prevented from making noise due to the prevention of metal-to-metal contact between the striker 22 and the latch 24.

The first cam 26 is rotatably coupled to the cam fastener 50 between a non-actuated state (FIGS. 3, 4, 7 and 8) in which the latch 24 is prevented from moving (or rotating) from the latched position to the unlatched position, and an actuated state (FIGS. 9-12) in which the latch 24 is allowed to move (or rotate) from the latched position to the unlatched position. When the first cam 26 is in the non-actuated state, the first cam 26 abuts against the latch 24. When the first cam 26 is in the actuated state, the first cam 26 is spaced apart from the latch 24 (i.e., does not abut against the latch 24).

The first cam 26 is moveable independently of the second cam 28 and includes a body 61 (FIGS. 3, 5 and 6), a cable tab 62 and a spring tab 63 (FIGS. 3-6, 8, 10 and 12). The body 61 includes an aperture 64 that may be aligned with the second apertures 38, 43 of the first and second plates 18, 20 such that the cam fastener 50 also extends through the aperture 64 of the body 61. In this way, the first cam 26 is rotatably coupled to and partially supported by the latch fastener 46. The cable tab 62 extends from a periphery of the body 61 and includes an opening 66 extending therethrough. A first end 68 of a cable 70 (FIGS. 1 and 2) may be securely received in the opening 66 of the cable tab 62, which causes the cable 70 and the first cam 26 to be engaged. When the first cam 26 is in the non-actuated state, the cable tab 62 abuts against the latch 24. When the first cam 26 is in the actuated state, the cable tab 62 is spaced apart from the latch 24 (i.e., does not abut against the latch 24).

As shown in FIGS. 1 and 2, an actuation device 72 may be mounted on the seatback 12 (e.g., at or near an upper end of the seatback) and engage to a second end 73 of the cable 70. In this way, the actuation device 72 may be operably connected to the first cam 26 such that movement of the actuation device 72 between a secure position and a release position causes corresponding rotation of the first cam 26 and movement of the latch 24 between the locked and unlocked positions. The actuation device 72 may include an actuation lever 74 and a spring 76. The spring 76 may bias the actuation lever 74 toward the secure position.

Figure 8:
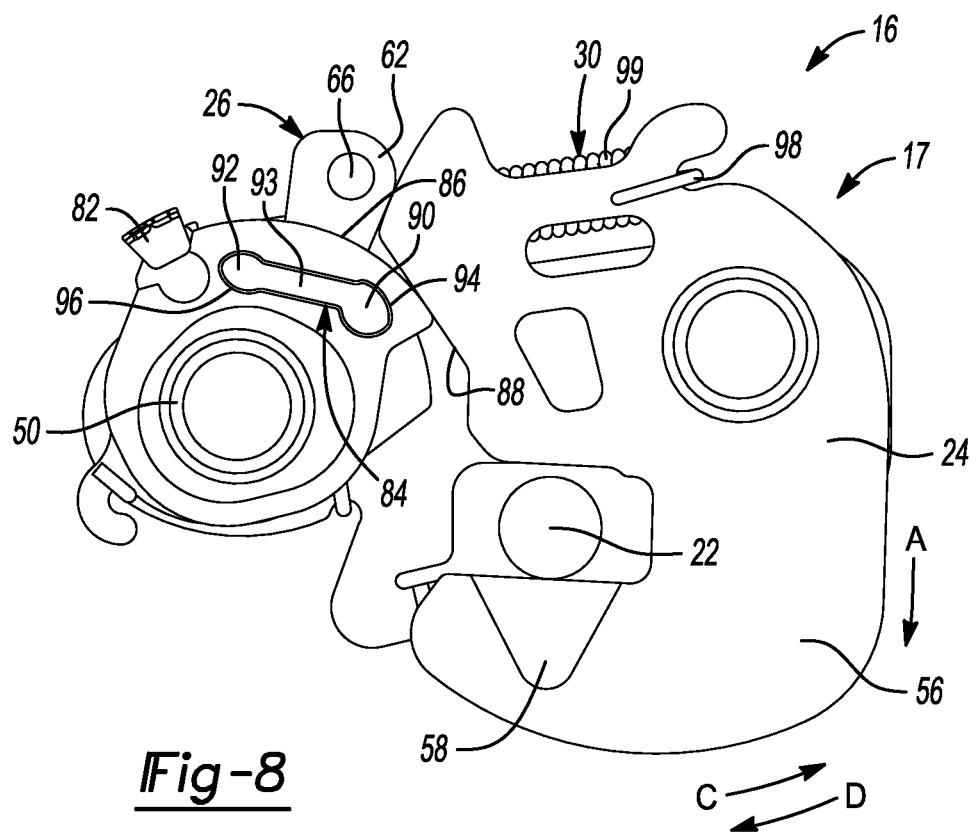
FIG. 8 is a front view of the latch assembly in the state of FIG. 7 with an outer plate of the latch assembly removed for clarity.
Figure 9:
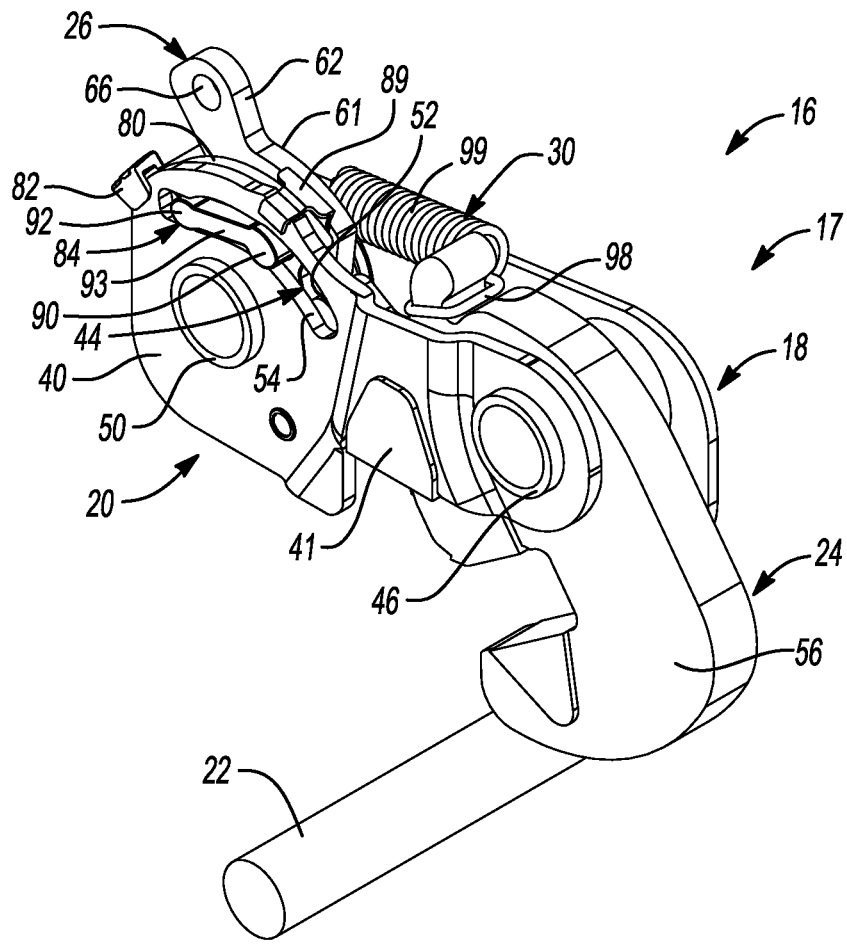
FIG. 9 is a perspective view of the latch assembly in a partially unlatched state.
Figure 10:
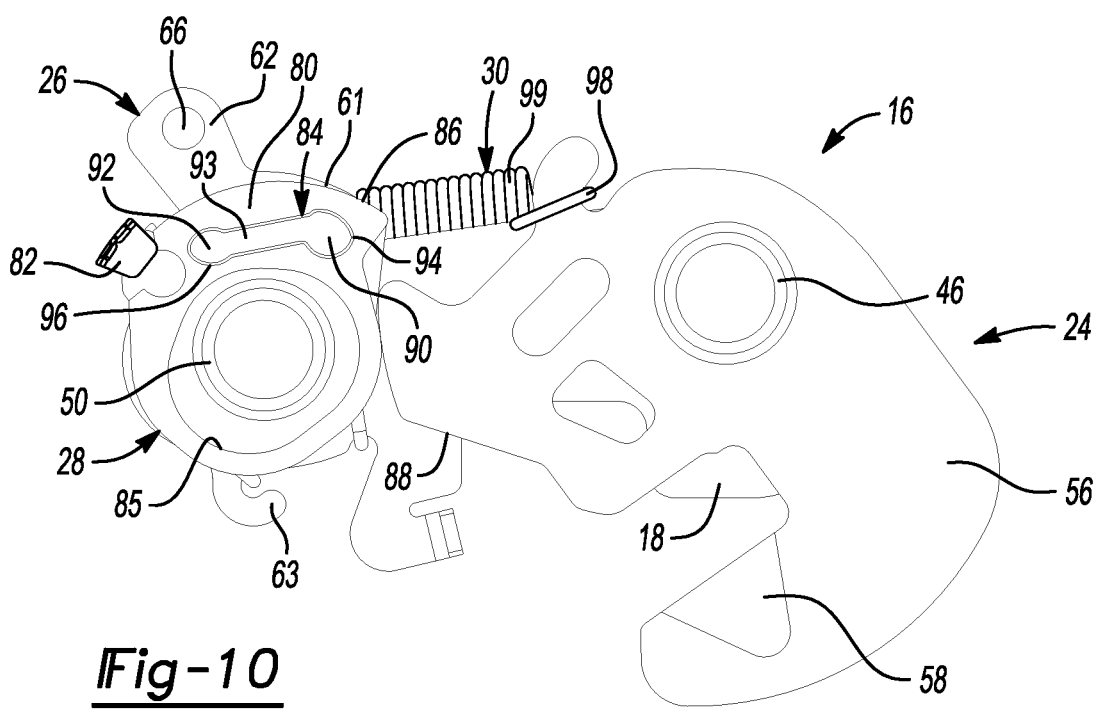
FIG. 10 is a front view of the latch assembly in the state of FIG. 9 with the outer plate removed for clarity.

The second cam 28 may be disposed between the second plate 20 and the first cam 26, and may be coupled to and supported by the second plate 20. The second cam 28 is also allowed to move (slide and/or rotate) relative to the first and second plates 18, 20. That is, when the first cam 26 is in the non-actuated state, the second cam 28 is engaged with the latch 24 to prevent the latch 24 from rotating from the latched position to the unlatched position (FIG. 8). When the first cam 26 is in the actuated state, the second cam 28 moves such that the second cam 28 is disengaged from (i.e., spaced apart) the latch 24, thereby allowing the latch 24 to rotate from the latched position to the unlatched position (FIGS. 10 and 12). As stated above, the path that the second cam 28 moves is controlled by the profiles of the first and second contoured surfaces 52, 54 of the slot 44.

With reference to FIGS. 3-12, the second cam 28 may include a body 80, a spring tab 81 (FIGS. 3-7), a coupler 82 and an elongated protrusion 84 (FIGS. 4, 6-12). The body 80 may include an aperture 85 extending therethrough. The cam fastener 50 extends through the aperture 85 and is spaced apart from the body 80 (i.e., the latch fastener 46 does not contact the body 80). The body 80 may include an outer surface profile 86 that engages a latch lock surface 88 of the latch 24 when the first cam 26 is in the non-actuated state (FIG. 8) to prevent the latch 24 from rotating from the latched position to the unlatched position. The outer surface profile 86 disengages the latch lock surface 88 when the first cam 26 is in the actuated state to allow the latch 24 to rotate from the latched position to the unlatched position (FIGS. 10 and 12).

The spring tab 81 extends from the body 80 in a first lateral direction and is coupled to the first spring 30. The spring tab 81 is also configured to engage the first cam 26 when the first cam 26 rotates from the non-actuated state to the actuated state. In this way, the second cam 28 moves so that the outer surface profile 86 disengages the latch lock surface 88 of the latch 24. The coupler 82 extends from the body 80 in a second lateral direction that is opposite the first lateral direction. The coupler 82 is coupled to the second plate 20 and is allowed to move relative to the second plate 20 as the second cam 28 moves along its path.

As shown in FIGS. 4, 7, 9 and 11, the protrusion 84 may extend outwardly from the body 80 and may be received in the slot 44. The protrusion 84 may also be configured to traverse the slot 44 as the second cam 28 moves along its path. The protrusion 84 may include a first end 90, a second end 92 and a connector 93 that connects the first end 90 and the second end 92. The first end 90 is generally circular-shaped and includes a first diametrical surface 94 that engages the second contoured surface 54 of the slot 44. The first diametrical surface 94 is spaced apart from the first contoured surface 52 of the slot 44 (i.e., does not engage the first contoured surface 52). The first diametrical surface 94 may also engage an end 95a of the slot 44 to stop further movement of the second cam 28 in Direction C.

The second end 92 is generally circular-shaped and includes a second diametrical surface 96 that engages the first contoured surface 52 of the slot 44. The second diametrical surface 96 is spaced apart from the second contoured surface 54 of the slot 44 (i.e., does not engage the second contoured surface 54). The second diametrical surface 96 includes a diameter that is smaller than a diameter of the first diametrical surface 94. In some configurations, the diameter of the second diametrical surface 96 may be equal to the diameter of the first diametrical surface 94. The second diametrical surface 96 may also engage an end 95b of the slot 44 that is opposite end 95a to stop further movement of the second cam 28 in Direction D.

As described above, the profile of the contoured surfaces 52, 54 define the path of movement of the second cam 28 (i.e., the second cam 28 does not rotate or pivot about a fixed axis of the latch mechanism 17). In this way, movement of the second cam 28 is fluid as the second cam 28 engages and disengages the latch 24. A retainer clip 89 may be coupled to the second plate 20 and may contact the second cam 28 to restrict lateral movement of the body 80 of the second cam 28 relative to the second plate 20.

Figure 5:
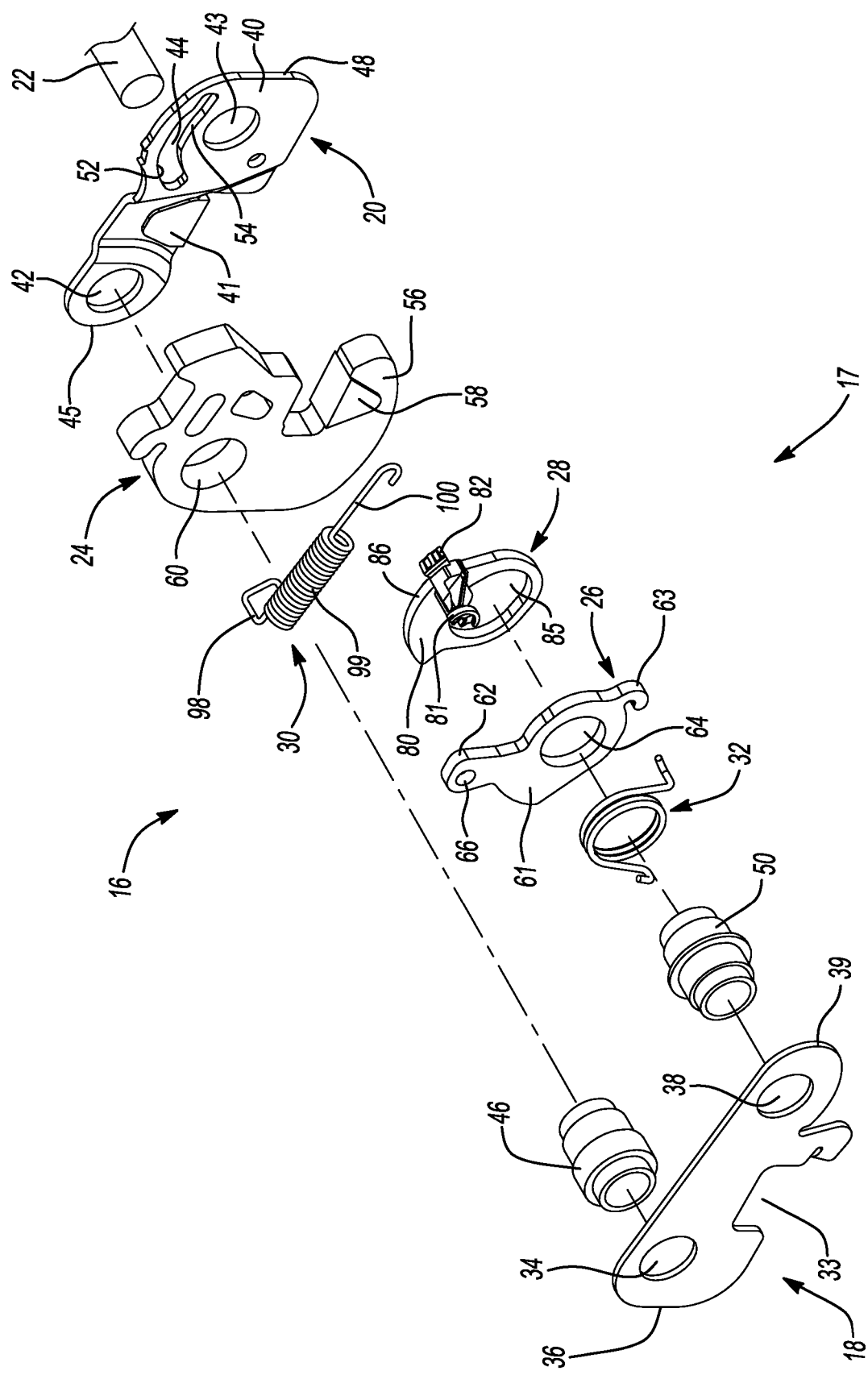
FIG. 5 is an exploded view of the latch assembly of FIG. 1.
Figure 6:
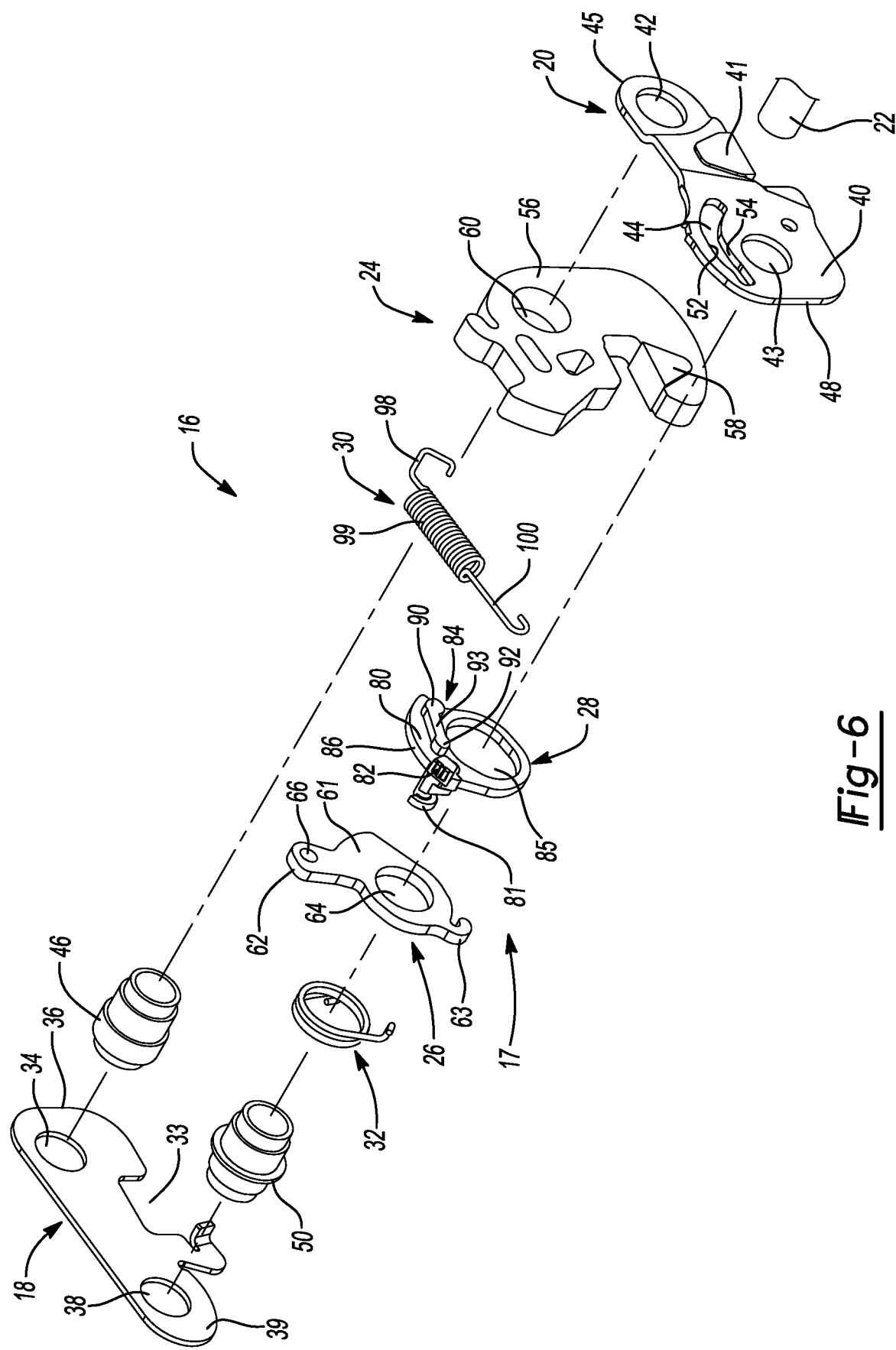
FIG. 6 is another exploded view of the latch assembly of FIG. 1.
Figure 7:
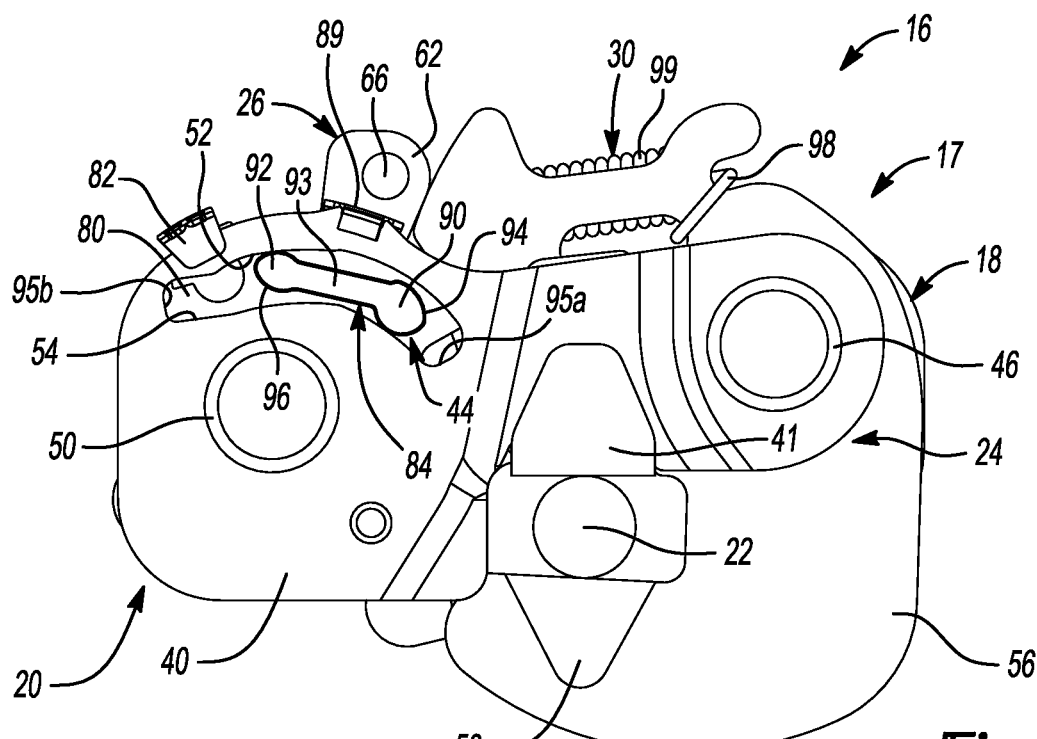
FIG. 7 is a front view of the latch assembly in a latched state.

As shown in FIGS. 3, 5 and 6, the first spring 30 may include a first end 98, a coil 99 and a second 100. The first end 98 may extend from an end of the coil 99 and may have a hook-shape that is engaged with the latch 24. The second end 100 may extend from another end of the coil 99 and may also have a hook-shape that is engaged with the spring tab 81. In this way, the latch 24 is rotationally biased toward the unlatched position.

The second spring 32 may exert a torsional force that rotationally biases the first cam 26 toward the non-actuated state. The second spring 32 may wrap around the cam fastener 50 and engage the spring tab 63 and the first plate 18.

With continued reference to FIGS. 1-12, operation of the latch mechanism 17 will now be described in detail. When a passenger (not shown) wants to ingress into or egress out of a space (e.g., a rear seating row) behind the vehicle seat assembly 10, the passenger may facilitate entry into or departure out of the space by moving the actuation lever 74 between the secure position and the release position to rotate the seatback 12 in Direction B.

Movement of the actuation lever 74 from the secure position to the release position causes rotation of the first cam 26 connected thereto (via the cable 70) from the non-actuated state to the actuated state. Rotation of the first cam 26 causes the first cam 26 to engage the second cam 28, thereby moving the second cam 28 out of engagement with the latch 24 (the outer surface profile 86 of the second cam 28 disengages from the latch lock surface 88 of the latch 24). Once the second cam 28 is out of engagement with the latch 24, the latch 24 moves from the latched position to the unlatched position, thereby permitting rotation of the seatback 12 in Direction B. In some configurations, where higher load capability from the latch mechanism 17 is not required, the first cam 26 may be omitted and the latch mechanism 17 may only include the second cam 28.

One of the advantages of the latch mechanism 17 of the present disclosure is that the second cam 28 prevents the latch 24 from rotating from the latched position to the unlatched position during higher static loading of the latch mechanism 17 without causing movement of the first cam 26. For example, during a vehicle accident, the engagement of the second cam 28 with the latch 24 and the second plate 20 (i.e., the outer surface profile 86 of the second cam 28 is engaged with the latch lock surface 88 of the latch 24, the first end 90 of the protrusion 84 is engaged with the second contoured surface 54 and the second end 92 is engaged with the first contoured surface 52) prevents the latch 24 from rotating from the latched position to the unlatched position.

Another advantage of the latch mechanism 17 of the present disclosure is that the second cam 28 compensates for wear of the internal components and/or positional variation of the striker 22 while still maintaining engagement with the latch 24, thereby preventing the latch 24 from rotating from the latched position to the unlatched position during dynamic loading of the latch mechanism 17, for example. For example, wear of the stop 41 of the plate 20 may cause the latch 24 to rotate further in Direction A (FIG. 8) when in the latched position such that the latch 24 maintains engagement with the striker 22. When the latch 24 rotates further in Direction A, the second cam 28 is allowed to move further in Direction C such that the second cam 28 remains in engagement with the latch 24 (i.e., the outer surface profile 86 of the second cam 28 remains in engagement with the latch lock surface 88 of the latch 24), thereby preventing the latch 24 from moving from the latched position to the unlatched position during dynamic loading of the latch mechanism 17.

It should be understood that although operation of the latch mechanism 17 in the present disclosure is shown and described with respect to latching and unlatching the seatback 12 to the striker 22 attached to a vehicle frame or body, the latch mechanism 17 may also be operable to latch and unlatch other components of the vehicle. For example, in some configurations, the latch mechanism 17 may be coupled to the seat bottom 14 and the striker 22 may be coupled to a vehicle floor. In such configurations, the latch mechanism 17 may operate as described above between a latched state in which movement of the seat bottom 14 relative to the vehicle floor is allowed and an unlatched state in which movement of the seat bottom 14 relative to the vehicle floor is restricted.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A latch mechanism for a vehicle seat assembly having a seatback and a seat bottom, the latch mechanism comprising:
   a latch coupled to one of the seatback and the seat bottom and movable between a first position in which the latch is configured to be engaged with a striker fixed to a vehicle body to prevent relative rotation between the seatback and the seat bottom and a second position in which the latch is configured to be disengaged from the striker to allow relative rotation between the seatback and the seat bottom;
   a plate fixed to the one of the seatback and the seat bottom and defining an arcuate slot;
   a first cam moveable between a first state in which the latch is prevented from moving from the first position to the second position, and a second state in which the latch is allowed to move from the first position to the second position; and
   a second cam coupled to the plate and including a body and a protrusion extending outwardly from the body, the protrusion received in the arcuate slot and configured to traverse the arcuate slot,
   wherein the first cam is moveable independently of the second cam.

2. The latch mechanism of claim 1, wherein the arcuate slot includes a first contoured surface and a second contoured surface, and wherein the protrusion includes a first end that contacts the first contoured surface and a second end that contacts the second contoured surface.

3. The latch mechanism of claim 2, wherein the first end is spaced apart from the second contoured surface and the second end is spaced apart from the first contoured surface.

4. The latch mechanism of claim 2, wherein the first end has a first diameter and the second end has a second diameter, and wherein the first diameter is larger than the second diameter.

5. The latch mechanism of claim 2, wherein a profile of the first contoured surface is different from a profile of the second contoured surface.

6. The latch mechanism of claim 2, wherein the protrusion is an elongated protrusion.

7. The latch mechanism of claim 1, further comprising a first spring biasing the latch toward the second position.

8. The latch mechanism of claim 7, further comprising a second spring biasing the first cam toward the first state.

9. A latch mechanism for a vehicle seat assembly comprising:
   a latch movable between a first position in which the latch is configured to be engaged with a striker and a second position in which the latch is configured to be disengaged from the striker;
   a plate defining an arcuate slot; and
   a second cam coupled to the plate and including a body and a protrusion extending outwardly from the body, the protrusion received in the arcuate slot and configured to traverse the arcuate slot when the latch is in the first position,
   wherein the arcuate slot includes a first contoured surface and a second contoured surface, wherein the protrusion includes a first end that contacts the first contoured surface and a second end that contacts the second contoured surface.

10. The latch mechanism of claim 9, wherein the first end is spaced apart from the second contoured surface and the second end is spaced apart from the first contoured surface.

11. The latch mechanism of claim 9, wherein the first end has a first diameter and the second end has a second diameter, and wherein the first diameter is larger than the second diameter.

12. The latch mechanism of claim 9, wherein a profile of the first contoured surface is different from a profile of the second contoured surface.

13. The latch mechanism of claim 9, wherein the protrusion is an elongated protrusion.

14. The latch mechanism of claim 9, further comprising a first cam moveable relative to the plate between a first state in which the latch is prevented from moving from the first position to the second position, and a second state in which the latch is allowed to move from the first position to the second position.

15. The latch mechanism of claim 14, wherein the first cam is movable independently of the second cam.

16. The latch mechanism of claim 15, wherein the second cam is engaged with the latch when the first cam is in the first state and disengaged from the latch when the first cam is in the second state.

17. The latch mechanism of claim 16, further comprising a first spring biasing the latch toward the second position.

18. The latch mechanism of claim 17, further comprising a second spring biasing the first cam toward the first state.

19. A latch mechanism for a vehicle seat assembly comprising:
   a latch movable between a first position in which the latch is configured to be engaged with a striker and a second position in which the latch is configured to be disengaged from the striker;
   a plate defining an arcuate slot; and
   a second cam coupled to the plate and including a body and a protrusion extending outwardly from the body, the protrusion received in the arcuate slot and configured to traverse the arcuate slot when the latch is in the first position,
   wherein the body includes an outer surface profile and the latch includes a wedge lock surface, and wherein the outer surface profile contacts the wedge lock surface when the latch is in the first position to prevent the latch from moving from the first position to the second position.

20. The latch mechanism of claim 19, wherein:
   the arcuate slot includes a first contoured surface and a second contoured surface, the protrusion includes a first end that contacts the first contoured surface and a second end that contacts the second contoured surface,
the first end is spaced apart from the second contoured surface and the second end is spaced apart from the first contoured surface,
the first end has a first diameter and the second end has a second diameter, wherein the first diameter is larger than the second diameter,
a profile of the first contoured surface is different from a profile of the second contoured surface, and
the protrusion includes an elongated connector portion that extends between the first and second ends.

* * * * *